US012592153B2

(12) United States Patent
Charala et al.

(10) Patent No.: US 12,592,153 B2
(45) Date of Patent: Mar. 31, 2026

(54) SYSTEM AND METHOD FOR OPTIMIZED ARRIVAL PROCEDURE SELECTION THROUGH FMS

(71) Applicant: Rockwell Collins, Inc., Cedar Rapids, IA (US)

(72) Inventors: Sujay Charala, Hyderabad (IN); Murali Mohan Godavarthi, Hyderabad (IN); Sambasivarao Vallepu, Narasarao Pet (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 98 days.

(21) Appl. No.: 18/405,280

(22) Filed: Jan. 5, 2024

(65) Prior Publication Data

US 2025/0166512 A1 May 22, 2025

(51) Int. Cl.
*G08G 5/21* (2025.01)
*G08G 5/26* (2025.01)
*G08G 5/32* (2025.01)
*G08G 5/54* (2025.01)

(52) U.S. Cl.
CPC ................. *G08G 5/21* (2025.01); *G08G 5/26* (2025.01); *G08G 5/32* (2025.01); *G08G 5/54* (2025.01)

(58) Field of Classification Search
CPC .. G08G 5/21; G08G 5/54; G08G 5/26; G08G 5/32
See application file for complete search history.

(56) References Cited

U.S. PATENT DOCUMENTS 5,121,325 A * 6/1992 DeJonge .............. G05D 1/0005 701/123
5,936,552 A 8/1999 Wichgers et al.
6,038,498 A * 3/2000 Briffe ..................... G01C 23/00 701/14
6,076,042 A 6/2000 Tognazzini
6,233,522 B1 5/2001 Morici
6,304,800 B1 10/2001 Ishihara et al.
6,711,479 B1 3/2004 Staggs
7,382,287 B1 6/2008 Chen et al.
7,437,225 B1 10/2008 Rathinam
7,589,646 B2 9/2009 Glover
7,797,086 B2 9/2010 Lorido et al.
8,155,803 B2 4/2012 Ferro
(Continued)

FOREIGN PATENT DOCUMENTS

WO 03098576 A1 11/2003

OTHER PUBLICATIONS

European Search Report received in EP Application No. 24214215.6, May 20, 2025, 9 pages.

*Primary Examiner* — Gertrude Arthur Jeanglaude
(74) *Attorney, Agent, or Firm* — Suiter Swantz IP

(57) ABSTRACT

A flight management system executes a method for arrival procedure display logic to reduce the overhead of pilots and air traffic controller by displaying a list of available arrival procedures sorted in a priority order based on headwind, estimated fuel on board, and estimated time of arrival. The pilot can select one of the available arrival procedures and request approval of the selected arrival procedure from the air traffic controller. The air traffic controller can clear the pilot for the selected arrival procedure or reject the selected arrival procedure if the selected arrival procedure is unavailable.

16 Claims, 5 Drawing Sheets

(56) References Cited

U.S. PATENT DOCUMENTS

| | | | |
|---|---|---|---|
| 8,193,948 B1 | 6/2012 | Shapiro et al. | |
| 8,718,933 B2 * | 5/2014 | Coulmeau | G08G 5/55 701/423 |
| 9,002,544 B1 | 4/2015 | Seah et al. | |
| 9,224,302 B1 | 12/2015 | Young et al. | |
| 9,266,621 B2 * | 2/2016 | Polansky | B64D 45/00 |
| 9,704,405 B2 * | 7/2017 | Kashi | G08G 5/26 |
| 9,704,406 B1 | 7/2017 | Young et al. | |
| 9,734,728 B2 | 8/2017 | Feyereisen et al. | |
| 10,777,086 B2 | 9/2020 | Barker et al. | |
| 10,977,950 B2 | 4/2021 | Agam et al. | |
| 11,004,348 B1 | 5/2021 | Lahr et al. | |
| 11,348,468 B1 | 5/2022 | Smith | |
| 2001/0056316 A1 | 12/2001 | Johnson et al. | |
| 2002/0089432 A1 | 7/2002 | Staggs et al. | |
| 2021/0090445 A1 | 3/2021 | Molnar et al. | |
| 2021/0407306 A1 | 12/2021 | Nielsen et al. | |
| 2022/0215760 A1 | 7/2022 | Jorgensen et al. | |
| 2022/0383761 A1 | 12/2022 | Krenz et al. | |

* cited by examiner

SYSTEM AND METHOD FOR OPTIMIZED ARRIVAL PROCEDURE SELECTION THROUGH FMS

CROSS-REFERENCE TO RELATED APPLICATIONS

The present application claims the benefit of India Provisional Patent Application 202311079417, filed Nov. 22, 2023, titled "SYSTEM AND METHOD FOR OPTIMIZED ARRIVAL PROCEDURE SELECTION THROUGH FMS", with a DAS code of A95F, which is incorporated herein by reference in the entirety.

TECHNICAL FIELD

The present invention generally relates to traffic control systems for aircraft, and more specifically to arrival procedures.

BACKGROUND

When an aircraft enters a terminal area, a pilot tunes a radio to an airport frequency to get wind, pressure at mean sea level (QNH), and other data required for landing. The pilot also interacts with the air traffic controller (ATC) to receive an available arrival procedure. While entering the arrival terminal area, the Pilot requests the ATC for the available arrival procedure at the destination airports. The ATC continuously monitors the available arrival procedures and responds to the pilot with the available arrival procedure and other required information for the arrival/approach and landing. The pilot should understand and strictly follow the instructions provided by the ATC for safe arrival and landing.

The pilot always depends on ATC to get the arrival procedure before landing. In busy airports, the ATC faces problems in the selection of arrival procedures due to the number of requests. Therefore, the pilot must wait for the ATC to initiate the arrival procedures. In busier airports when there are too many aircrafts about to enter the terminal area of the destination airport, the ATC may process many requests at a time. The number of requests may delay the processing and approval and allocation of the arrival procedure to the aircraft. As the number of aircrafts approaching the terminal area increase, the time before receiving the approach procedure increases, leading to further delay. The delay may cause fuel and time consumption while the aircraft is in a hold pattern.

The ATC must handle many requests at a time in the busy airports. It is an overhead for the ATC to choose and accommodate correct arrival procedure and runway for landing of an aircraft and provide required arrival information to the pilot. It is very crucial to accommodate the best-suited arrival procedure and runway for the aircraft coming near to the airport in busy traffic conditions.

To receive the arrival procedure, the pilot contacts the ATC for the available arrival procedure through oral communications. The oral communication raises the possibility of human error. The oral communication may raise a possibility of miscommunication or misunderstandings due to the different slangs or different dialects of the language used by the pilots of different regions.

Therefore, it would be advantageous to provide a device, system, and method that cures the shortcomings described above.

SUMMARY

A flight management system is described, in accordance with one or more embodiments of the present disclosure. The flight management system comprises a memory maintaining program instructions. The flight management system comprises one or more processors configured to execute the program instructions. The program instructions cause the one or more processors to get a plurality of arrival procedures, an availability status associated with the plurality of arrival procedures, and wind data. The program instructions cause the one or more processors to calculate an estimated fuel on board and an estimated time of arrival for each of the plurality of arrival procedures which are available. The program instructions cause the one or more processors to determine a priority of the plurality of arrival procedures based first on maximizing a headwind during each of the plurality of arrival procedures, second on maximizing the estimated fuel on board, and third on minimizing the estimated time of arrival. The program instructions cause the one or more processors to cause a flight display to display the plurality of arrival procedures which are available based on the priority.

In embodiments, the memory maintains a flight plan. The flight plan comprises an arrival runway. The one or more processors are configured to get the plurality of arrival procedures which are associated with the arrival runway.

In embodiments, the one or more processors are configured to get the plurality of arrival procedures from a navigation database.

In embodiments, the one or more processors are configured to get the availability status associated with the plurality of arrival procedures and the wind data from a communication system.

In embodiments, the one or more processors are configured to cause the flight display to display the plurality of arrival procedures which are unavailable below the plurality of arrival procedures which are available.

In embodiments, the one or more processors are configured to receive a selected arrival procedure. The selected arrival procedure is one of the plurality of arrival procedures which are available.

In embodiments, the one or more processors are configured to receive the selected arrival procedure from the flight display.

In embodiments, the one or more processors are configured to cause a communication system to transmit a clearance request to fly the selected arrival procedure.

In embodiments, the one or more processors are configured to cause the communication system to transmit a clearance request to fly the selected arrival procedure via a controller pilot data link communication message.

In embodiments, the one or more processors are configured to receive a clearance to fly the selected arrival procedure from the communication system, acknowledge the clearance to fly the selected arrival procedure, and active the selected arrival procedure in a flight plan.

In embodiments, the flight management system comprises the flight display.

In embodiments, the headwind during each of the plurality of arrival procedures is based on the wind data and a heading during each of the plurality of arrival procedures.

In embodiments, the one or more processors are configured to calculate the estimated time of arrival using a flight path distance and a current ground speed.

In embodiments, the one or more processors are configured to calculate the estimated fuel on board using a zero-fuel weight, a gross weight, a current fuel weight, and a fuel flow.

An aircraft is described, in accordance with one or more embodiments of the present disclosure. The aircraft comprises a flight display. The aircraft comprises a flight management system. The flight management system comprises a memory maintaining program instructions. The flight management system comprises one or more processors configured to execute the program instructions. The program instructions cause the one or more processors to get a plurality of arrival procedures, an availability status associated with the plurality of arrival procedures, and wind data. The program instructions cause the one or more processors to calculate an estimated fuel on board and an estimated time of arrival for each of the plurality of arrival procedures which are available. The program instructions cause the one or more processors to determine a priority of the plurality of arrival procedures based first on maximizing a headwind during each of the plurality of arrival procedures, second on maximizing the estimated fuel on board, and third on minimizing the estimated time of arrival. The program instructions cause the one or more processors to cause the flight display to display the plurality of arrival procedures which are available based on the priority.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
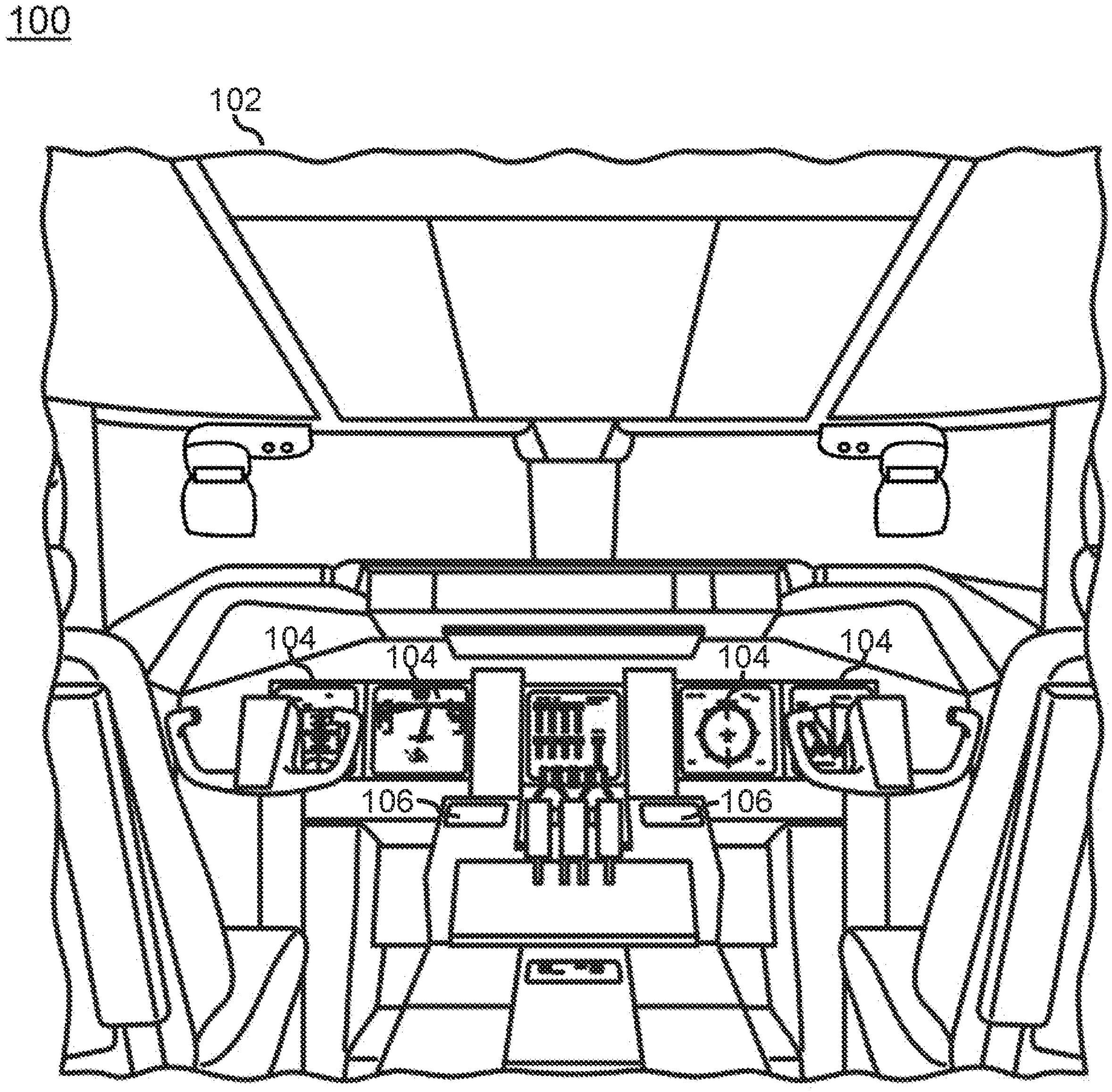
FIG. 1 depicts a schematic illustration of a cockpit of an aircraft, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are directed to a flight management system. The flight management system executes a method for arrival procedure display logic to reduce the overhead of pilots and air traffic controllers by displaying a list of available arrival procedures sorted in a priority order based on headwind, estimated fuel on board, and estimated time of arrival. The pilot can select one of the available arrival procedures and request approval of the selected arrival procedure from the air traffic controller. The air traffic controller can clear the pilot for the selected arrival procedure or reject the selected arrival procedure if the selected arrival procedure is unavailable.

U.S. Pat. No. 7,382,287B1, titled "Avionics system, method and apparatus for selecting a runway"; U.S. Pat. No. 9,734,728B2, titled "Systems and methods for destination selection for vehicle indications and alerts"; U.S. Publication Number US20220383761A1, titled "Dynamic navigation procedures"; U.S. Pat. No. 9,002,544B1, titled "System, device, and method for presenting instrument approach procedure advisory information to a pilot on an aircraft"; U.S. Pat. No. 9,224,302B1, titled "Four dimensional flight management with time control system and related method"; U.S. Publication Number US20210407306A1, titled "Flight management system departure and arrival performance display based on weather data uplink"; are each incorporated herein by reference in the entirety.

Referring to FIG. 1, a schematic illustration of a cockpit 102 of an aircraft 100 is described, according to one or more embodiments of the present disclosure. The cockpit 102 may include one or more flight displays 104 and one or more user interface ("UI") elements 106.

The flight displays 104 may be implemented using any of a variety of display technologies, including CRT, LCD, organic LED, dot matrix display, and others. The flight displays 104 may be navigation (NAV) displays, primary flight displays, electronic flight bag displays, tablets, synthetic vision system displays, head up displays (HUDs) with or without a projector, multi-function flight displays, control display units (CDUs), and the like. The flight displays 104 may be used to provide information to the flight crew, thereby increasing visual range and enhancing decision-making abilities. One or more of the flight displays 104 may be configured to function as, for example, a primary flight display (PFD) used to display altitude, airspeed, vertical speed, and navigation and traffic collision avoidance system (TCAS) advisories. One or more of the flight displays 104 may also be configured to function as, for example, a multi-function display used to display navigation maps, weather radar, electronic charts, TCAS traffic, aircraft maintenance data and electronic checklists, manuals, and procedures. One or more of the flight displays 104 may also be configured to function as, for example, an engine indicating and crew-alerting system (EICAS) display used to display critical engine and system status data. Other types and functions of the flight displays 104 are contemplated as well. According to various exemplary embodiments of the inventive concepts disclosed herein, at least one of the flight displays 104 may be configured to provide a rendered display from the systems and methods of the present disclosure.

In some embodiments, the flight displays 104 may provide an output based on data received from a system external to an aircraft, such as a ground-based weather radar system, satellite-based system, or from a system of another aircraft. In some embodiments, the flight displays 104 may provide an output from an onboard aircraft-based radar system, LIDAR system, infrared system or other system on an aircraft. For example, the flight displays 104 may include a weather display, a weather radar map, and a terrain display. In some embodiments, the flight displays 104 may provide an output based on a combination of data received from multiple external systems or from at least one external system and an onboard aircraft-based system. The flight displays 104 may include an electronic display or a synthetic vision system (SVS). For example, the flight displays 104 may include a display configured to display a two-dimensional (2-D) image, a three-dimensional (3-D) perspective image of terrain and/or weather information, or a four-dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The flight displays 104 are configured to receive data that is entered manually by a pilot or flight crew. For example, the flight displays 104 may include one or more of the UI elements 106. The flight displays 104 may include one or more fields that are selectable. For example, if the flight displays 104 are touchscreen displays, a selection may be made of one or more options by touching the flight displays 104.

The UI elements 106 may include, for example, dials, switches, buttons, touch screens, keyboards, a mouse, joysticks, cursor control devices (CCDs), multi-purpose control display unit ("MCDU"), or other multi-function key pads certified for use with avionics systems. The UI elements 106 may be configured to, for example, allow an aircraft crew member to interact with various avionics applications and perform functions such as data entry, manipulation of navigation maps, and moving among and selecting checklist items. For example, the UI elements 106 may be used to adjust features of the flight displays 104, such as contrast, brightness, width, and length. The UI elements 106 may also (or alternatively) be used by an aircraft crew member to interface with or manipulate the displays of the flight displays 104. For example, the UI elements 106 may be used by aircraft crew member to adjust the brightness, contrast, and information displayed on the flight displays 104. The UI elements 106 may additionally be used to acknowledge or dismiss an indicator provided by the flight displays 104. The UI elements 106 may be used to correct errors on the flight displays 104. Other UI elements 106, such as indicator lights, displays, display elements, and audio alerting devices, may be configured to warn of potentially threatening conditions such as severe weather, terrain, and obstacles, such as potential collisions with other aircraft.

Figure 2:
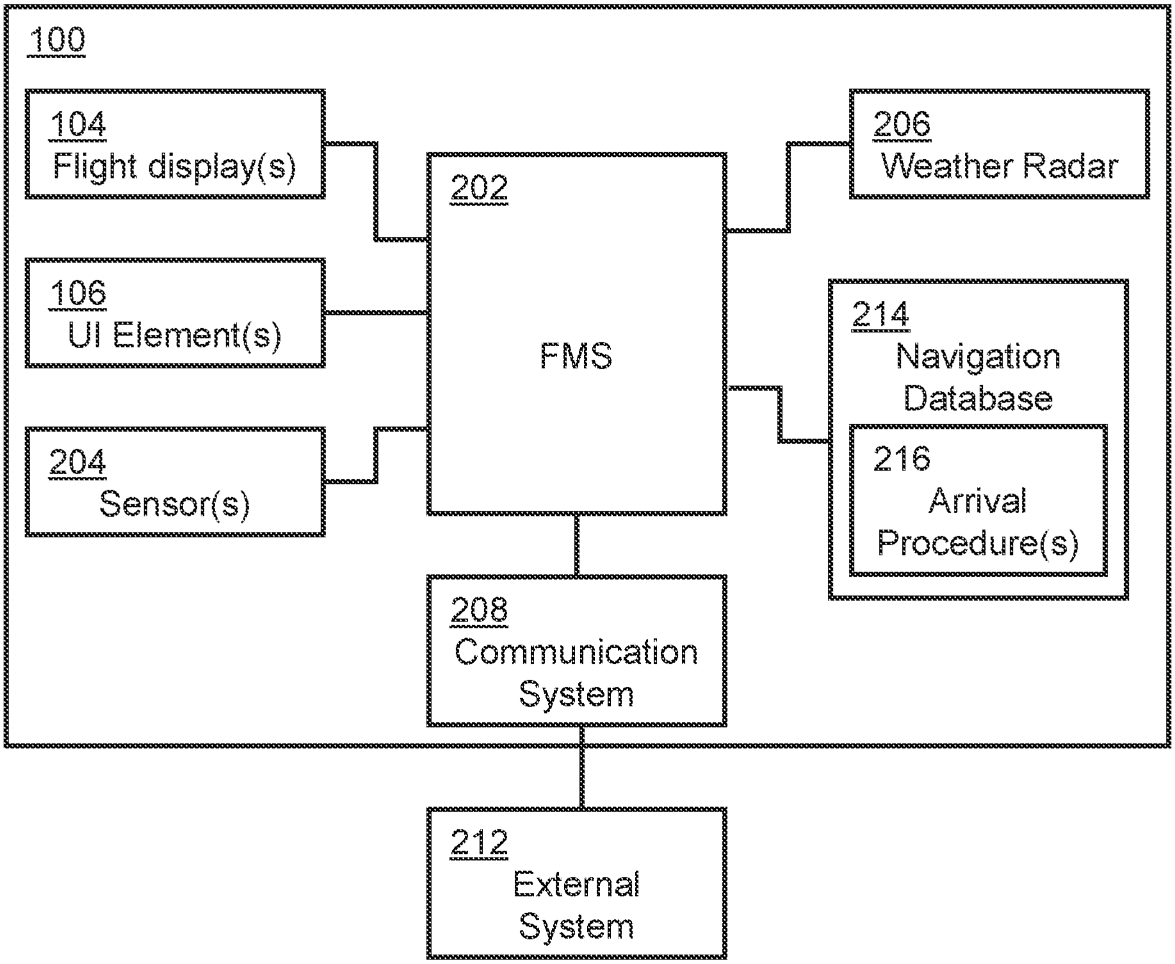
FIG. 2 depicts a block diagram of an aircraft including a flight management system, in accordance with one or more embodiments of the present disclosure.

Referring to FIG. 2, a block diagram of the aircraft 100 is described, according to one or more embodiments of the present disclosure. The aircraft 100 includes a flight management system 202, the flight displays 104 and UI elements 106, a plurality of sensors 204, a weather radar system 206, a communication system 208, and the like. The aircraft 100 may include other systems and components for general aircraft operation.

The aircraft 100 may include the flight management system 202 (FMS). The flight management system 202 is configured to send data to and receive data from, or otherwise facilitate electronic data communications, with the other systems of the aircraft 100 or with remote systems such as satellite-based systems or ground-based systems. The flight management system 202 may further interface with an aircraft control system, aircraft monitoring system, or other such system. The flight management system 202 may be configured to generally receive input from the various other systems and determine one or more flight parameters for a takeoff, cruse, arrival, or landing phase of flight based on the inputs. In embodiments, the flight management system 202 may be configured to perform any of the actions described with any of the various other systems of the aircraft 100 as described herein. The flight management system 202 may generally be configured to calculate one or more flight parameters for the aircraft during an arrival procedure. The flight management system 202 may further be responsible for other general aircraft-related functionality. For example, the flight management system 200 may perform a variety of functions for managing the flight of the aircraft 100. Functions performed by the flight management system 200 may include creating and managing a flight plan from waypoints.

The aircraft 100 may include one or more sensors 204. The sensors 204 may include, for example, one or more fuel sensors, airspeed sensors, location tracking sensors (e.g., GPS), lightning sensors, turbulence sensors, pressure sensors, optical systems (e.g., camera system, infrared system), weather sensors, such as outside air temperature sensors, winds at altitude sensors, INS G load (in-situ turbulence) sensors, barometric pressure sensors, humidity sensors, or any other aircraft sensors or sensing system that may be used to monitor the performance of an aircraft or weather local to the aircraft. The sensors 204 may include one or more sensors configured to acquire air data indicative of at least one air characteristic (e.g., a pressure, an indicated airspeed, a true airspeed, an angle of attack, a pitch angle, an altitude, a temperature) of an environment surrounding the aircraft. The sensors 204 may be in various positions on the aircraft 100. The sensors 204 may be configured to acquire more than one type of sensor data. The sensors 204 may further include one or more sensors configured to measure various aircraft flight parameters (e.g., the weight of the aircraft). In embodiments, the sensors 204 may generate latitude data, longitude data, altitude data, course data, speed heading data, and the like. In embodiments, the sensors 204 may include at least one of a GPS, a Global Navigation Satellite System (GNSS), an altitude heading and reference system (AHRS), and an inertial reference system (IRS). The sensors 204 may be configured to acquire flight data indicative of at least one flight characteristic of the aircraft 100. The flight characteristics may include, for example, a position (e.g., latitude, longitude), altitude, course, speed (e.g., ground speed, vertical speed), and/or heading of the aircraft. Data from the sensors 204 may be output to the flight management system 202. The data from the sensors 204 may be received by the flight management system 202 for processing and display.

The aircraft 100 may include the weather radar system 206. The weather radar system 206 may be a system for detecting weather patterns. For example, the weather radar system 206 may detect wind patterns (e.g., a wind speed, a wind direction, forecasted winds, a magnetic heading, a cross-track, and the like). The wind data may be transmitted from the weather radar system 206 to the flight management system 202 to adjust a takeoff or landing speed, descent angle, and the like. The weather radar system 206 may estimate wind data using wind models, and may further detect other weather conditions (e.g., precipitation, temperature, humidity) that may impact the aircraft. In some embodiments, the weather radar system 206 is configured to detect rain, ice, slush, and snow on the surface of the runway and to provide this information to the flight management system 202. The flight management system 202 may be configured to receive data from the weather radar system 206 and may use the received data to determine the runway condition (e.g., an amount of rain, ice, slush, or snow covering the surface of the runway).

The aircraft 100 may include the communication system 208. The communication system 208 facilitates communications between the flight management system 202 and one or more external systems 212 (e.g., a satellite system, other aircraft, a terrestrial station, or other air, space, or ground-based system). For example, the communication system 208 may send data to and receive data from external ground-based weather supplier systems and ground-based air traffic control systems. The communication system 208 may communicate with the external system 212 using any type of communication protocol or network (e.g., via a mobile network, via one or more bi-directional or uni-directional communication channels) and may include any type of wireless interface for facilitating the communication. In embodiments, the external system 212 is an air traffic controller (ATC). The ATC may broadcast various data. For example, the ATC may broadcast the availability status of all the arrival procedures 216, headwind data, temperature, and the like. The ATC may broadcast the data through one or more uplink messages. The aircraft 100 may receive the data from the ATC as the aircraft 100 approaches an arrival terminal zone. In this regard, the aircraft 100 may receive data via the communication system 208.

The aircraft 100 may include a navigation database 214. The navigation database 214 stores data associated with a flight plan, such as, but not limited to, published IAPs, ground-based navigational aids, waypoints, holding patterns, airways, airports, heliports, instrument departure procedures, instrument arrival procedures, runways, precision approach aids, company routes, airport communications, localizer and airway markers, special use airspace, airport sector altitudes, enroute airways restrictions, enroute communications, preferred routes, controlled airspace, geographical references, arrival and/or departure flight planning, path point records, and GNSS Landing Systems. The navigation database 214 may be compliant with one or more file format standards, such as, but not limited to, Aeronautical Radio, Incorporated ("ARINC") Specification-424.

In embodiments, the navigation database 214 includes arrival procedures 216. The arrival procedures 216 may be associated with one or more airports. For example, the arrival procedures 216 may be associated with the arrival airport of the aircraft 100. The arrival procedures 216 may be implemented using the flight management system 202. The arrival procedures 216 may take the aircraft 100 from enroute to approach phases of flight. The arrival procedures 216 may include waypoints, vectors, trajectory information for flight legs between the waypoints, radio frequency settings used during the flight legs, and the like. The trajectory information may include altitude, longitude, latitude, time, speed, and the like for each of the flight legs. The arrival procedures 216 may include a standard terminal arrival route procedure ("STAR") or the like.

Figure 3:
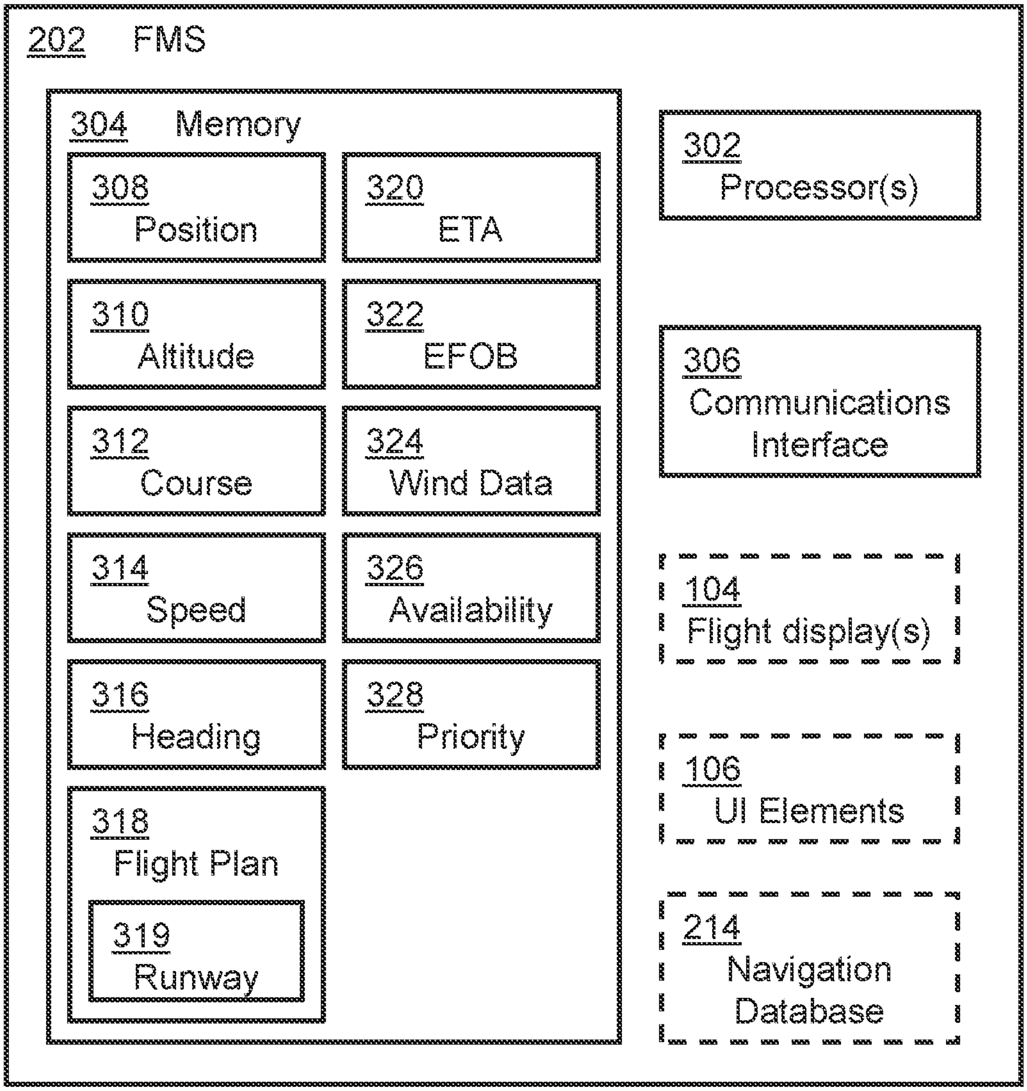
FIG. 3 depicts a block diagram of a flight management system, in accordance with one or more embodiments of the present disclosure.

Referring now to FIG. 3, the flight management system 202 is described, in accordance with one or more embodiments of the present disclosure. The flight management system 202 may include one or more processors 302, a memory 304, a communication interface 306, and the like. For completing the activities described herein, the flight management system 202 may have knowledge of the destination of the aircraft 100 (for arrival profile calculations), the current location of the aircraft, a current time, and a destination time. The pilot may enter, before departure, a current location, departure time, estimated landing time, and/or destination (e.g., another airport). Alternatively, the information may be retrieved via the communications interface 306. The flight management system 202 may know the arrival airport, the flight plan, and the like.

In embodiments, the flight management system 202 includes the communications interface 306. The communications interface 306 may be configured to facilitate communications between the flight management system 202 and other components of the aircraft 100.

In embodiments, the memory 304 may include program instructions. The program instructions may be executable by the processors 302. In embodiments, the processors 302 executes one or more steps of a method for optimized arrival procedure selection.

In embodiments, the memory 304 may include a position 308, altitude 310, course 312, speed 314, and/or heading 316. The position 308, altitude 310, course 312, speed 314, and/or heading 316 may be received and then maintained in memory 304. For example, the flight management system 202 may receive the position 308, altitude 310, course 312, speed 314, and/or heading 316 from the one or more sensors 204. The position 308 may include a latitude and a longitude. The position 308 may be a global navigation satellite system (GNSS) position. For example, the position 308 may include a global positioning system (GPS) position. For example, the aircraft 100 may include a GPS receiver which determines the position 308. The altitude 310 may be distance of the aircraft 100 above ground. The heading 316 may be a compass direction of the aircraft 100. The course 312 may be a direction in which the aircraft 100 is to be steered. The speed 314 may include a ground speed and/or a vertical speed. The heading 316 may be a direction in which a nose of the aircraft 100 is pointed.

In embodiments, the memory 304 may include a flight plan 318. The flight plan 318 may be received and then maintained in memory 304. For example, the flight management system 202 may receive the flight plan 318 from the UI elements 106. For instance, a pilot may input the flight plan 318 using the UI elements 106 before take-off. The flight management system 202 may use the flight plan 318 to guide the aircraft 100 from one position to the next. The flight management system 202 may also use the flight plan 318 to calculate many flight parameters including, but not limited to, estimated time enroute, estimated time of arrival to a destination airport and/or alternate airport, and estimated fuel consumption between waypoints. The flight plan 318 may include various data, such as, but not limited to, an arrival runway 319.

In embodiments, the memory 304 may include estimated time of arrival 320 (ETA) and/or estimated fuel on board 322 (EFOB). The processors 302 may retrieve the arrival procedures 216 from the navigation database 214 and calculate the estimated time of arrival 320 and/or estimated fuel on board 322 for each of the arrival procedures 216. The processors 302 may calculate the estimated time of arrival 320 and/or estimated fuel on board 322 and then maintain the estimated time of arrival 320 and/or estimated fuel on board 322 in memory 304.

The processors 302 may calculate the estimated time of arrival 320 for each of the arrival procedures 216 using one or more parameters. For example, the processors 302 may calculate the estimated time of arrival 320 using a flight path distance, a current ground speed of the aircraft 100, and the like.

The estimated fuel on board 322 refers to the estimated fuel on board when the aircraft 100 reaches the arrival runway 319. The processors 302 may calculate the estimated fuel on board 322 for each of the arrival procedures 216 using one or more parameters. For example, the processors 302 may calculate the estimated fuel on board 322 using a zero-fuel weight, a gross weight, a current fuel weight, a fuel flow, the wind data 324 (e.g., cross-wind components, headwind components, tailwind components, etc.), an average fuel consumption during descent, and the like.

In embodiments, the memory 304 may include wind data 324 and/or availability status 326. The wind data 324 and/or availability status 326 may be received and then maintained in memory 304. For example, the flight management system 202 may receive the wind data 324 and the availability status 326 from the external system 212 (e.g., the ATC). The wind data 324 may include wind speed and a wind direction at the arrival runway 319. For example, the wind data 324 may be reported in miles per hour at a select angle in degrees. The wind data 324 may be determined from data contained in a variety of weather products such as, but not limited to, Aviation Routine Weather Report ("METAR"), Significant Meteorological Information ("SIGMET"), Airmen's Meteorological Information ("AIRMET"), Next-Generation Radar ("NEXRAD"), surface analysis weather maps, surface pressure, surface wind speed and direction, winds aloft, wind shear detection, echo tops, and freezing levels. The availability status 326 indicates the arrival procedures 216 are available or unavailable. For example, the arrival procedures 216 may be unavailable if another aircraft is currently flying the arrival procedure. The availability status 326 may be broadcast from the ATC to all aircrafts entering the airport.

In embodiments, the memory 304 may include a priority 328. The processors 302 may determine the priority 328 and then maintain the priority 328 in memory 304. The priority 328 refers to a priority in which to display the arrival procedures 216. The processors 302 may determine the priority 328 based on one or more input parameters, such as, but not limited to, position 308, altitude 310, course 312, speed 314, and/or heading 316 upon entering the airport terminal area. In embodiments, the processors 302 determine the priority 328 based on wind data 324, estimated fuel on board 322, and estimated time of arrival 320. Priority may go to the arrival procedures 216 with a highest headwind component of the wind data 324, second priority may go to the arrival procedures 216 with a highest estimated fuel on board 322, and third priority may go to the arrival procedures 216 with a least estimated time of arrival 320. In other words, the processors 302 may determine the priority 328 of the arrival procedures 216 based first on maximizing the headwind during each of the arrival procedures 216, second on maximizing the estimated fuel on board 322, and third on minimizing the estimated time of arrival 320.

In embodiments, the processors 302 are configured to generate an output for one or more of the flight displays 104. The processors 302 may cause the flight displays 104 to display the arrival procedures 216 which are available along with the runway for destination airport based on the priority 328. In some embodiments, the headwind, the estimated fuel on board 322, and the estimated time of arrival 320 may be displayed adjacent to the arrival procedures 216. In some embodiments, the processors 302 are configured to cause the flight displays 104 to display the arrival procedures 216 which are unavailable below the arrival procedures 216 which are available. For example, the arrival procedures 216 which are unavailable may be displayed with an unavailable status.

Although FIG. 2 depicts the flight displays 104, UI elements 106, and navigation database 214 as being separate from the flight management system 202, this is not intended as a limitation of the present disclosure. In embodiments, the flight management system 202 may include the flight displays 104, UI elements 106, and/or navigation database 214.

Figure 4A:
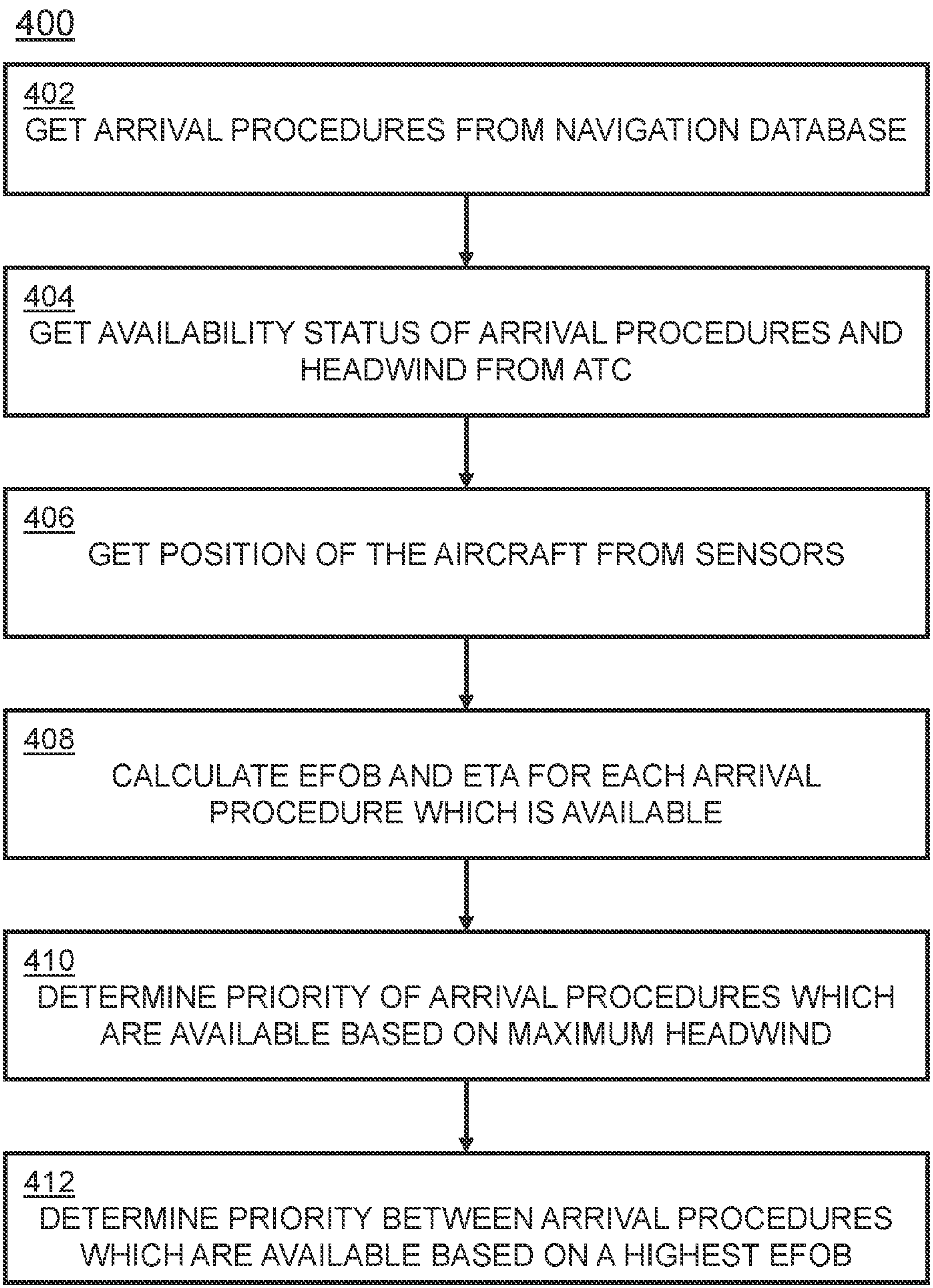
FIGS. 4A-4B depict a flow diagram of a method, in accordance with one or more embodiments of the present disclosure.
Figure 4B:
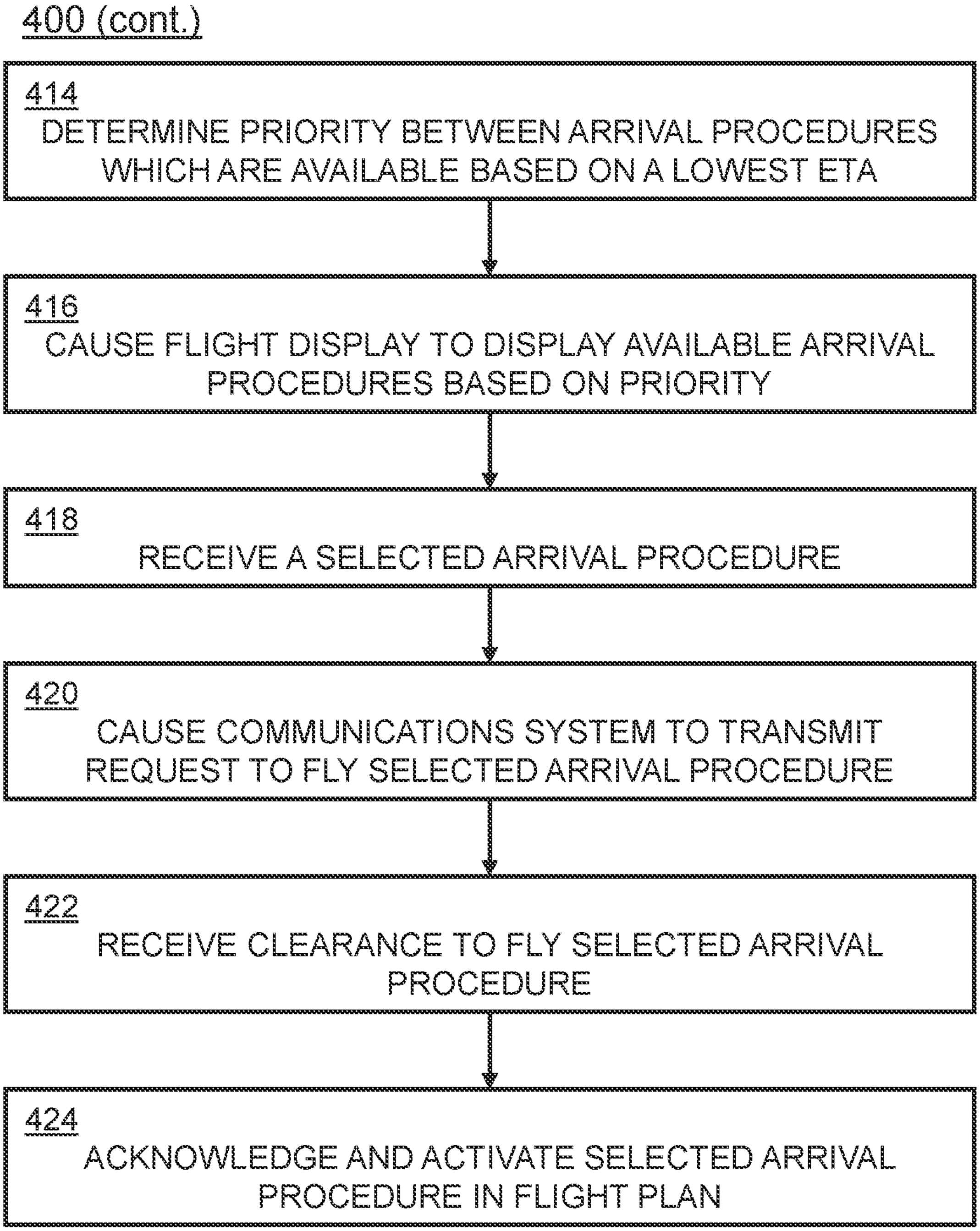

Referring now to FIGS. 4A-4B, a flow diagram of a method 400 is described, in accordance with one or more embodiments of the present disclosure. The method 400 is for arrival procedure display logic. The embodiments and the enabling technology described previously herein in the context of the aircraft 100 should be interpreted to extend to the method. For example, the method may be implemented by the processors 302.

In a step 402, the processors 302 get the arrival procedures 216. The processors 302 may get the arrival procedures 216 from the navigation database 214. In embodiments, the processors 302 get the arrival procedures 216 associated with the arrival runway 319. For example, the navigation database 214 may include arrival procedures associated with many runways. The processors 302 may get the arrival procedures 216 associated with each arrival runway 319.

In a step 404, the processors 302 get the availability status 326 associated with the arrival procedures 216 and the wind data 324. The processors 302 may get the availability status 326 associated with the arrival procedures 216 and the wind data 324 from the ATC through an uplink message. For example, the ATC may broadcast the availability status 326 associated with the arrival procedures 216 and the wind data

324. The communication system 208 may receive the broadcast of the availability status 326 associated with the arrival procedures 216 and the wind data 324. The processors 302 may then get the availability status 326 associated with the arrival procedures 216 and the wind data 324 from the communication system 208 via the communications interface 306.

In a step 406, the processors 302 get the position 308. The processors 302 may get the position 308 from the sensors 204. The processors 302 may also get the altitude 310, course 312, speed 314, and/or heading 316 from the sensors 204. In some embodiments, one or more of the step 402, step 404, and step 406 may be performed simultaneously. In this regard, the processors 302 may get the arrival procedures 216, the availability status 326 associated with the arrival procedures 216, the wind data 324, the position 308, the altitude 310, the course 312, the speed 314, the heading 316, and the like.

In a step 408, the processors 302 calculates the estimated fuel on board 322 and estimated time of arrival 320 for each of the arrival procedures 216 which are available. The processors 302 may or may not calculate the estimated fuel on board 322 and estimated time of arrival 320 for each of the arrival procedures 216 which are not available. The arrival procedures 216 are available or not available based on availability status 326. In some embodiments, the processors 302 may calculate the estimated fuel on board 322 and estimated time of arrival 320 for each of the arrival procedures 216 on a regular interval (e.g., 1 Hz interval or the like). In some embodiments, the processors 302 may calculate the estimated time of arrival 320 using a flight path distance and a current ground speed. In some embodiments, the processors 302 may calculate the estimated fuel on board 322 using a zero-fuel weight, a gross weight, a current fuel weight, and a fuel flow. In some embodiments, the processors 302 may also calculate a distance, a bearing, a heading, and the like for each arrival procedure 216.

In a step 410, the processors 302 may determine the priority 328 of the arrival procedures 216 which are available based on a maximum headwind. The priority 328 of the arrival procedures 216 which are available may be determined based on maximizing a headwind component of the wind data 324 during the arrival procedures. The headwinds help with a smooth landing and may reduce fuel consumption. Thus, arrival procedures 216 associated with maximizing the headwinds receive the highest priorities. Maximizing the headwind of the wind data 324 during each of the arrival procedures 216 may be determined based on the wind data 324 and the heading 316 of the aircraft 100 during the arrival procedures 216. For example, the heading 316 may be on-axis to the wind direction or off-axis to the wind direction of the wind data 324. The headwind component of the wind is maximized and a cross-wind component of the wind is minimized when the heading 316 is on-axis to the wind direction. The headwind component of the wind is minimized and the cross-wind component of the wind is maximized when the heading 316 is off-axis to the wind direction. Furthermore, the heading 316 may be at an angle between on-axis and off-axis with the wind direction of the wind data 324.

In a step 412, the processors 302 may determine the priority 328 of the arrival procedures 216 based second on maximizing the estimated fuel on board 322. If multiple of the arrival procedures 216 have the same headwind, then priority 328 goes to the arrival procedures 216 which maximize the estimated fuel on board 322 at the arrival runway 319. Maximizing the estimated fuel on board 322 may mean the arrival procedures 216 takes less fuel. For example, the arrival procedures 216 which are determined to have a same headwind in the previous step may be sorted in priority order from highest to lowest estimated fuel on board 322. The arrival procedures 216 may be considered to include a same headwind when the wind data 324 is not available.

In a step 414, the processors 302 may determine the priority 328 of the arrival procedures 216 based third on minimizing the estimated time of arrival 320. If multiple of the arrival procedures 216 have the same estimated fuel on board 322, then priority 328 goes to the arrival procedures 216 which minimize the estimated time of arrival 320 at the arrival runway 319. In this regard, if multiple of the arrival procedures 216 have the same headwind and the same estimated fuel on board 322, then priority 328 goes to the arrival procedures 216 which minimize the estimated time of arrival 320. For example, the arrival procedures 216 which are determined to have a same estimated fuel on board 322 in the previous step may be sorted in priority order based on the from highest to lowest estimated time of arrival 320. The arrival procedures 216 may be considered to include a same estimated time of arrival 320 when the estimated time of arrival 320 is not available.

Thus, the priority 328 of the arrival procedures 216 may be determined based first on maximizing the headwind during the arrival procedures 216, second on maximizing the estimated fuel on board 322, and third on minimizing the estimating time of arrival 320.

In a step 416, the processors 302 may cause the flight display 104 to display the arrival procedures 216 which are available based on the priority 328. For example, the processors 302 may cause the flight display 104 to display the arrival procedures 216 from highest to lowest headwind, from highest to lowest estimated fuel on board 322 where the headwind is the same or is not available, and from lowest to highest estimated time of arrival 320 where the headwind and the estimated fuel on board 322 are the same or are not available. Phrased another way, the arrival procedures 216 are displayed in decreasing order of headwind, decreasing order of estimated fuel on board 322, and in increasing order of estimated time of arrival 320.

The processors 302 may be configured to cause the flight display 104 to display the arrival procedures 216 which are unavailable below the arrival procedures 216 which are available. If any of the arrival procedures 216 are unavailable, as indicated by the availability status 326, the arrival procedures 216 which are unavailable may be displayed below the arrival procedures 216 which are available after the above defined priority 328. Thus, the arrival procedures 216 which are unavailable are displayed after the arrival procedures 216 which are available. The arrival procedures 216 which are unavailable may include a status message indicating busy, unavailable, or the like. Thus, the flight management system 202 may display all the arrival procedures 216 along with the corresponding arrival runway 319 as per the arrival procedure display logic. Displaying the arrival procedures 216 according to the arrival procedure display logic gives the pilot an option to request/select the optimized arrival procedure and runway which will have a highest headwind (allowing reduced groundspeed when landing) and consume minimum fuel/minimum ETA.

In a step 418, the processors 302 may receive a selected arrival procedure. The selected arrival procedure is one of the arrival procedures 216 which are available. The processors 302 may receive the selected arrival procedure in response to displaying the arrival procedures 216 on the flight display 104. The processors 302 may receive the selected arrival procedure from the flight display 104 and/or the UI elements 106. In some embodiments, the processors 302 may receive the selected arrival procedure via the communications interface 306. For example, a pilot may select any of the arrival procedure 216 which are available and displayed on the flight displays 104 as the selected arrival procedure. For instance, the pilot may select the selected arrival procedure via an ATC downlink request option which is displayed with the arrival procedures 216 on the flight displays 104. The pilot selects the available optimum runway based on the status broadcasted by ATC. The selected arrival procedure is then received by the processors 302.

In a step 420, the processors 302 may cause the communication system 208 to transmit a clearance request to fly the selected arrival procedure. For example, the communication system 208 may transmit the clearance request to fly the selected arrival procedure to the ATC. The communication system 208 may transmit the clearance request to fly the selected arrival procedure to the ATC via a controller pilot data link communications (CPDLC) message, or the like. Thus, the flight management system 202 may request ATC for clearance of the selected runway through a downlink message. The clearance request to fly the selected arrival procedure may be transmitted for clearance from ATC to fly the selected arrival procedure.

In a step 422, the processors 302 may receive clearance to fly the selected arrival procedure. The processors 302 may receive clearance to fly the selected arrival procedure from the communication system 208. For example, the communication system 208 may receive the clearance to fly the selected arrival procedure from ATC in response to transmitting the clearance request to fly the selected arrival procedure. The communication system 208 may receive the clearance via a CPDLC message, or the like. Thus, the clearance request and the clearance may be transmitted without requiring audio communication between the pilot and the ATC. The ATC may confirm and acknowledge the selected arrival procedure is available. The same message may be up-linked to Pilot along with the other information required for landing (e.g., Course, winds, runway condition, etc.). Thus, the ATC may clear the selected arrival procedure through an uplink message when the selected arrival procedure is available.

If the requested arrival procedure is not available, the ATC may reject the clearance request to fly the selected arrival procedure and suggests another of the arrival procedures 216 which is available in the CPDLC. In case none of the arrival procedures are available, the ATC may transmit a hold procedure.

In a step 424, the processors 302 may acknowledge the clearance to fly the selected arrival procedure and activate the selected arrival procedure in the flight plan 318. The flight management system 202 may activate the selected arrival procedure in the flight plan 318 in response to receiving the clearance. The ATC may change the status of the selected arrival procedure for all other aircraft from available to unavailable in response to receiving the acknowledgement. The ATC may then broadcast the updated availability status 326 to all the aircrafts within the terminal area of the airport.

Once the selected arrival procedure is cleared and acknowledged, the aircraft 100 may fly the selected arrival procedure. For example, the pilot or an autopilot may fly the selected arrival procedure. Once the aircraft 100 flies the selected arrival procedure and completes the landing procedure, the flight management system 202 may cause the communication system 208 to transmit a message releasing the selected arrival procedure. For example, the flight management system 202 cause the communication system 208 to transmit a CPDLC message to ATC releasing the selected arrival procedure. The ATC may then change the status of the selected arrival procedure from unavailable to available for all other aircraft.

Referring generally again to the figures. The arrival procedure display logic provides a list of available arrival procedures in the order of maximum head winds/maximum EFOB at destination/minimum ETA so that pilot has an option to select the optimum arrival procedure. It is contemplated that the arrival procedure display logic provides several benefits.

The arrival procedure display logic may enable the pilot to choose the available optimum arrival procedure and get the clearance from ATC with less turnaround time based on the performance computations done by FMS. The reduced turnaround time may result in optimum fuel consumption and hence considerable fuel savings. As the available arrival procedure can be selected by the pilot based on maximum head wind magnitudes and optimum fuel/time computations provided by performance function of FMS, the optimal selection may result in considerable fuel and time saving. For example, for a standard commercial aircraft, the fuel consumption for flying 5 minutes will be approximately 50 kg of fuel in normal weather conditions in airport terminal area. By using the proposed method, if the pilot can select an optimum arrival procedure which may save a minimum of 1 minute of flying time, approximately 10 kg of fuel can be saved.

The arrival procedure display logic may reduce the number of oral communications involved because the arrival procedure and runway request by the pilot and the approval/rejection of the runway request by the ATC are implemented by uplink and downlink messages (e.g., CPDLC messages). The pilot errors due to the misunderstanding or miscommunication with ATC may also be drastically reduced and may lead to reduced number of accidents.

In some embodiments, the method 400 may be initiated before the aircraft 100 enters the destination airport terminal area. The pilot has the visibility of the available arrival procedures and runways before the aircraft enters the terminal area and can choose the optimum arrival procedure and runway for landing. From the pilot's point of view, the dependency on ATC will also be reduced. The turnaround time for the runway clearance may also be reduced which also results in considerable time and fuel saving.

The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term “processor” may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A flight management system comprising:

a memory maintaining program instructions; and one or more processors configured to execute the program instructions causing the one or more processors to:

get a plurality of arrival procedures, an availability status associated with the plurality of arrival procedures, and wind data;

calculate an estimated fuel on board and an estimated time of arrival for each of the plurality of arrival procedures which are available;

determine a priority of the plurality of arrival procedures based first on maximizing a headwind during each of the plurality of arrival procedures, second on maximizing the estimated fuel on board, and third on minimizing the estimated time of arrival; and cause a flight display to display the plurality of arrival procedures which are available based on the priority and to display the headwind, the estimated fuel on board, and the estimated time of arrival adjacent to the plurality of arrival procedures.

2. The flight management system of claim 1, wherein the memory maintains a flight plan; wherein the flight plan comprises an arrival runway; wherein the one or more processors are configured to get the plurality of arrival procedures which are associated with the arrival runway.

3. The flight management system of claim 2, wherein the one or more processors are configured to get the plurality of arrival procedures which are associated with the arrival runway from a navigation database.

4. The flight management system of claim 1, wherein the one or more processors are configured to get the availability status associated with the plurality of arrival procedures and the wind data from a communication system.

5. The flight management system of claim 1, wherein the one or more processors are configured to cause the flight display to display the plurality of arrival procedures which are unavailable below the plurality of arrival procedures which are available.

6. The flight management system of claim 1, wherein the one or more processors are configured to receive a selected arrival procedure in response to displaying the plurality of arrival procedures on the flight display; wherein the selected arrival procedure is one of the plurality of arrival procedures which are available.

7. The flight management system of claim 6, wherein the one or more processors are configured to receive the selected arrival procedure from the flight display.

8. The flight management system of claim 6, wherein the one or more processors are configured to cause a communication system to transmit a clearance request to fly the selected arrival procedure.

9. The flight management system of claim 8, wherein the one or more processors are configured to cause the communication system to transmit the clearance request to fly the selected arrival procedure via a controller pilot data link communication message.

10. The flight management system of claim 8, wherein the one or more processors are configured to receive a clearance to fly the selected arrival procedure from the communication system, acknowledge the clearance to fly the selected arrival procedure, and active the selected arrival procedure in a flight plan, wherein an autopilot is configured to cause an aircraft to fly the selected arrival procedure in the flight plan.

11. The flight management system of claim 1, comprising the flight display.

12. The flight management system of claim 1, wherein the headwind during each of the plurality of arrival procedures is based on the wind data and a heading during each of the plurality of arrival procedures.

13. The flight management system of claim 1, wherein the one or more processors are configured to calculate the estimated time of arrival using a flight path distance and a current ground speed.

14. The flight management system of claim 1, wherein the one or more processors are configured to calculate the estimated fuel on board using a zero-fuel weight, a gross weight, a current fuel weight, and a fuel flow.

15. A system for an aircraft, the system comprising:

a flight display; and a flight management system comprising:

a memory maintaining program instructions; and one or more processors configured to execute the program instructions causing the one or more processors to:

get a plurality of arrival procedures, an availability status associated with the plurality of arrival procedures, and wind data;

calculate an estimated fuel on board and an estimated time of arrival for each of the plurality of arrival procedures which are available;

determine a priority of the plurality of arrival procedures based first on maximizing a headwind during each of the plurality of arrival procedures, second on maximizing the estimated fuel on board, and third on minimizing the estimated time of arrival; and cause the flight display to display the plurality of arrival procedures which are available based on the priority and to display the headwind, the estimated fuel on board, and the estimated time of arrival adjacent to the plurality of arrival procedures.

16. The system of claim 15, wherein the one or more processors are configured to receive a selected arrival procedure; wherein the selected arrival procedure is one of the plurality of arrival procedures which are available;

the system comprising:

a communication system, wherein the one or more processors are configured to cause the communication system to transmit a clearance request to fly the selected arrival procedure, wherein the one or more processors are configured to receive a clearance to fly the selected arrival procedure from the communication system, acknowledge the clearance to fly the selected arrival procedure, and active the selected arrival procedure in a flight plan; and an autopilot, wherein the autopilot is configured to cause the aircraft to fly the selected arrival procedure in the flight plan.

* * * * *